United States Patent [19]

Abiko

[11] Patent Number: 5,930,207
[45] Date of Patent: Jul. 27, 1999

[54] MAGNETO-OPTICAL RECORDING MEDIUM HAVING PLURAL DIELECTRIC LAYERS WITH DIFFERENT THERMAL CONDUCTIVITIES

[75] Inventor: Toru Abiko, Miyagi, Japan

[73] Assignee: Sony Corporation, Tokyo, Japan

[21] Appl. No.: 08/984,044

[22] Filed: Dec. 3, 1997

[30] Foreign Application Priority Data

Dec. 4, 1996 [JP] Japan ................................. 8-324262

[51] Int. Cl.$^6$ .............................. G11B 11/00; G11B 5/66
[52] U.S. Cl. .................................... 369/13; 428/694 ML; 428/694 DE
[58] Field of Search .................................. 369/13, 275.2, 369/275.3, 283, 286, 288, 275.4, 275.5; 428/694 DE, 694 MM, 694 EC, 284, 694 ML, 694 SC; 360/59, 114

[56] References Cited

U.S. PATENT DOCUMENTS

| | | | |
|---|---|---|---|
| 5,341,349 | 8/1994 | Kagami et al. | 369/13 |
| 5,552,237 | 9/1996 | Utsunomiya et al. | 428/634 ML |
| 5,589,282 | 12/1996 | Kubogata | 428/694 ML |
| 5,665,468 | 9/1997 | Sekiya et al. | 428/332 |

*Primary Examiner*—Ali Neyzari
*Attorney, Agent, or Firm*—Hill & Simpson

[57] ABSTRACT

A magneto-optical recording medium provided with a first dielectric layer formed on a substrate, a second dielectric layer containing at least silicone nitride and formed on the first dielectric layer, and a recording layer consisting of a magnetic film with a Curie temperature of the 200° C. or higher and formed on the second dielectric layer. This magneto-optical recording medium is characterized in that the thermal conductivity of the first dielectric layer is smaller than that of the second dielectric layer.

5 Claims, 5 Drawing Sheets

FIG.1
(PRIOR ART)
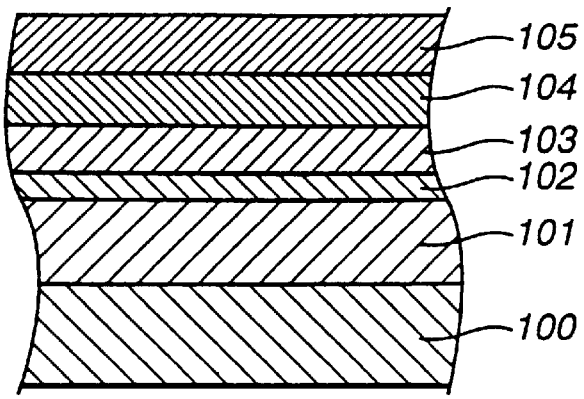
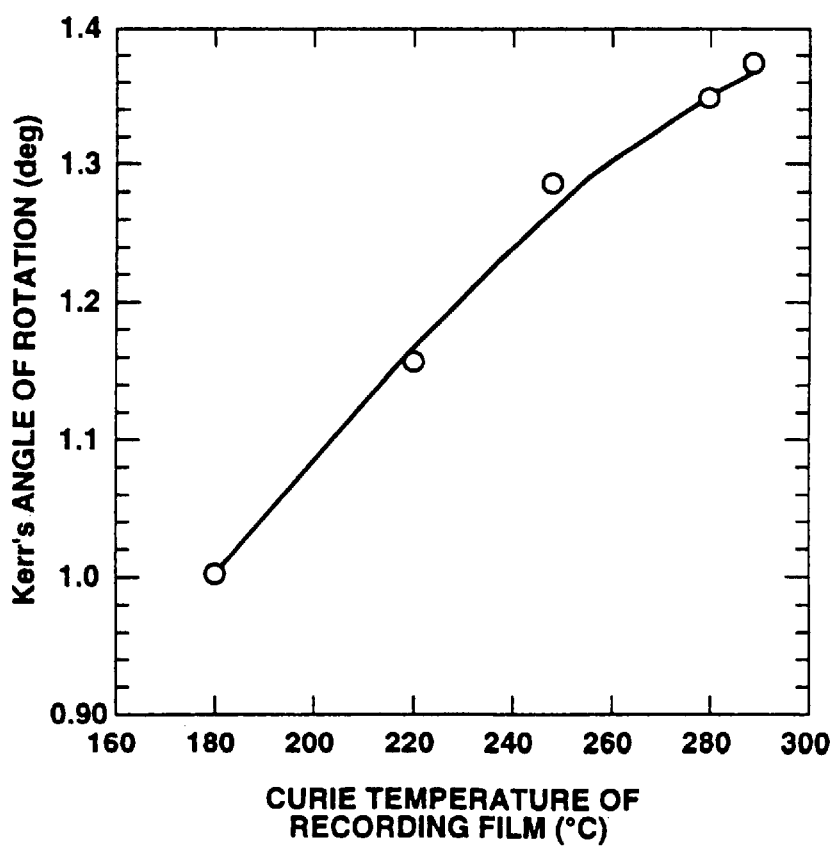
FIG.2
(PRIOR ART)

MAGNETO-OPTICAL RECORDING MEDIUM HAVING PLURAL DIELECTRIC LAYERS WITH DIFFERENT THERMAL CONDUCTIVITIES

BACKGROUND OF THE INVENTION

This invention relates to magneto-optical recording media for reproducing information signals by virtue of magneto-optical effects. More particularly, the invention relates to a magneto-optical recording medium in which it is possible to set the curie temperature of a recording layer at a high level.

Recently, for example, in the field of recording media used for computers or the like, a demand is apparent for expansion of the recording capacity of a recording medium which is used as an external memory, with increase of information to be processed. Further, in the field of conventional magneto-optical recording and reproducing apparatus on ISO format, a red laser diode that emits a laser whose wavelength is 680 nm has been used, and systems which have a recording capacity four times as large as that of the conventional machine are available in the market. Furthermore, a demand for systems which allow a recording capacity eight times as large as that of the conventional machine has become acute.

The magneto-optical disk which is used for such a recording and reproducing apparatus is constructed, as shown in FIG. 1, such that a substrate 100 which is made of PC (polycarbonate) or glass transmissible to a laser beam has a lower dielectric layer 101, a recording film 102, an upper dielectric layer 103, a reflective film 104 and a protective film 105 formed one over the other successively in this order. These the lower dielectric layer 101 and the upper dielectric layer 103 are composed, for example, of silicone nitride (SiN), the recording film 102 is composed, for example, of a TbFeCo amorphous compound, the reflective film 104 is composed, for example, of Al, and the protective film is composed, for example, of a UV curing resin.

With this magneto-optical disk, when information signals are recorded on the recording film 102, a laser beam is applied to the recording film 102. This leads to the increase of temperature of the recording film 102, and when the temperature of the recording film 102 becomes higher than its curie temperature, the magnetism of the recording film 102 disappears. Later, during a process whereby the recording film is cooled, a specified external magnetic field is applied to that recording film 102, and, through this process, magnetising of the recording film 102 takes place in a desired direction, and thus a record mark having a specified magnetising is formed.

For the magneto-optical disk working on above principle to acquire a large capacity to record signals, it is necessary reduction in the size of the record mark. However, with the magneto-optical disk, to reduce the size of the record mark will lead to the deterioration of signal quantity. On the other hand, with a magneto-optical disk incorporating a recording film 102 made of rare earth metals/transition metals, it is possible to improve signal reproduction by raising the curie temperature of the recording film 102. With this magneto-optical disk, it is possible to compensate for the deteriorated signal capacity due to the contracted record mark by incorporating a recording film 102 whose curie temperature has been set high. With such magneto-optical disk, it is possible to set the curie temperature of the recording film 102 at a desired level by appropriately altering the composition of elements constituting the recording film 102.

Here reference is made to FIG. 2 which illustrates a characteristic graph relating the curie temperature of a recording layer 102 and Kerr's angle of rotation of the disk with a four-layered structure. This Kerr's angle of rotation gives a value proportional to signal quantity. As is obvious from FIG. 2, the higher the curie temperature of the recording film 102, the larger the Kerr's angle of rotation. Namely, it is possible to enlarge signal quantity by setting the curie temperature of the recording film at a high level.

With the above-described magneto-optical disk, however, if the curie temperature of the recording film 102 is set high to enlarge signal quantity, it will be necessary to raise the temperature of the recording film 102 by the same degree during recording. With the magneto-optical disk, when information signals are recorded, the recording film 102 temperature is raised until it is not less than the curie temperature, and thus a large amount of calories will be transmitted to the substrate 100. As a result, with the magneto-optical disk of such constitution, deterioration of the substrate due to heat will ensue. With the magneto-optical disk, if deterioration of the substrate takes place, the so-called repetitive recording and reproducing performance will be deteriorated, too. To be more specific, with a conventional magneto-optical disk which incorporates a recording film 102 made of rare earth metals/transition metals, it is customary to set the curie temperature at around 180° C. at highest.

Accordingly, with the conventional magneto-optical disk as described above, it is difficult to set the curie temperature of the recording film 102 at a high level, thereby to enlarge signal quantity, and thus to record on the basis of minute record marks enabling a high density recording.

SUMMARY OF THE INVENTION

With such situation characteristic with conventional magneto-optical disks as a background, this invention has been proposed, and intends to provide a magneto-optical recording medium which is capable of enlarging signal quantity without deteriorating the repetitive recording and reproducing performance, by setting the curie temperature of a recording film at a high level.

The magneto-optical recording medium of this invention which has been achieved to attain the above-described object has a first dielectric layer formed on a substrate, a second dielectric layer formed on the first dielectric layer and containing at least silicone nitride, and a recording layer formed on the second dielectric layer and having a magnetic film whose curie temperature is not less than 200° C. This magneto-optical recording medium is produced after the thermal conductivity of the first dielectric layer has been made small as compared with that of the second dielectric layer.

With the magneto-optical recording medium of this invention with above constitution, the first dielectric layer is so constructed as to have a smaller thermal conductivity than does the second dielectric layer. Therefore, with this magneto-optical disk, it becomes difficult for heat in the recording layer to be transmitted to the substrate. Accordingly, as deterioration of the substrate due to heating does not take place in this magneto-optical disk, the disk will have a good repetitive recording and reproducing property.

BRIEF DESCRIPTION OF THE DRAWINGS

FIG. 1 is a cross-sectional view of the part of interest of a conventional magneto-optical disk.

FIG. 2 gives a characteristic graph relating the curie temperature of a recording layer and the Kerr's angle of rotation of the same recording layer.

DETAILED DESCRIPTION OF PREFERRED EMBODIMENTS

Figure 3:
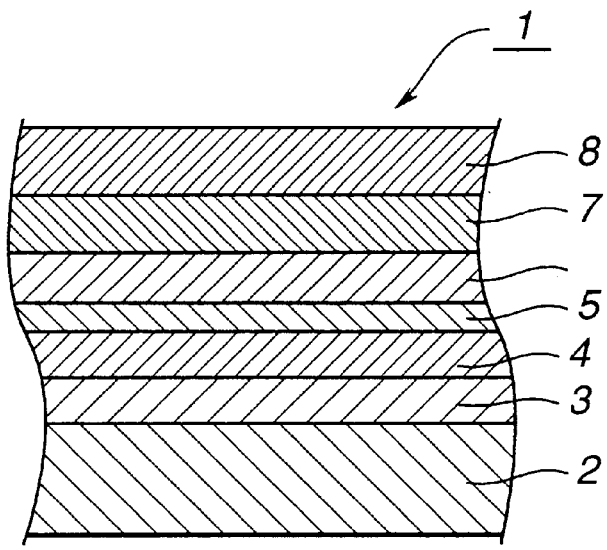
FIG. 3 is a cross-sectional view of the part of interest of a magneto-optical recording medium according to this invention.

A detailed description will be given below about concrete embodiments of this invention with reference to figures. As the embodiment of this invention, the magneto-optical disk 1 in the form of disc to act as a magneto-optical recording medium illustrated in FIG. 3 will be chosen for illustration.

A magneto-optical disk 1 or one embodiment of this invention is provided with a substrate 2 which is made of polycarbonate (to be referred to as PC hereinafter), glass or the like transmissible to a laser beam, a first dielectric layer 3 formed on the substrate 2, a second dielectric layer 4 formed on the first dielectric layer 3, a recording film 5 formed on the second dielectric layer 4, an upper dielectric layer 6 formed on the recording film 5, a reflective layer 7 formed on the upper dielectric layer 6, and a protective film 8 formed on the reflective layer 7.

The first dielectric layer 3 is preferably made of a material containing at least ZnS, and is composed, for example, of ZnS—$SiO_2$. Further, the second dielectric layer 4 is preferably made of a material containing at least silicone nitride, and is composed, for example, of $Si_3N_4$. Furthermore, the recording film 5 is composed, for example, of a TbFeCo amorphous compound. Still further, the upper dielectric layer 6 is composed, for example, of silicone nitride ($Si_3N_4$, etc.). Still further, the reflective layer 7 is composed, for example, of Al. Still further, the protective layer is composed, for example, of a UV curing resin.

With this magneto-optical disk 1, the thermal conductivity of the first dielectric layer 3 is made smaller than that of the second dielectric layer 4. To be more specific, the thermal conductivity of the first dielectric layer is preferably ⅕ to ⅓ that of the second dielectric layer 4, or more preferably about ¼ that of the latter. When the first dielectric layer 3 is made of a material containing ZnS, its thermal conductivity will be about 0.0066 [J/(cm.sec.°C.)], and, when the second dielectric layer 4 is composed of SiN, its thermal conductivity will be about 0.03 [J/(cm.sec.°C.)].

With this magneto-optical disk 1, the optimum value for the thickness of the first dielectric layer 3 and the second dielectric layer 4 was determined as follows.

Figure 4:
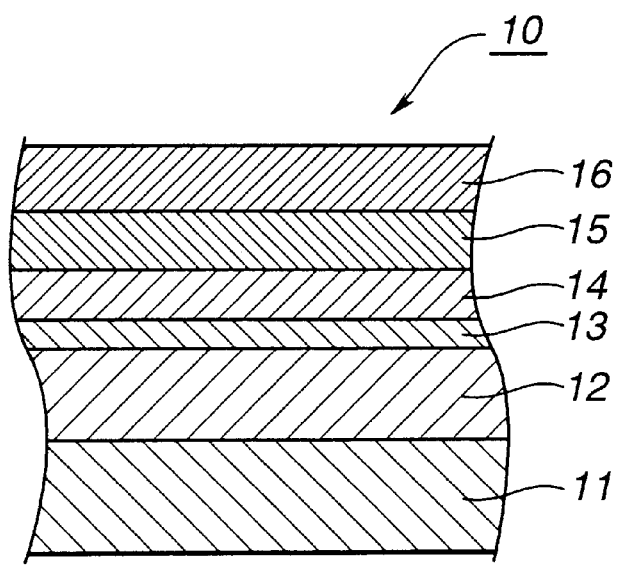
FIG. 4 is a cross-sectional view of the part of interest of a four-layered magneto-optical disk.
Figure 5:
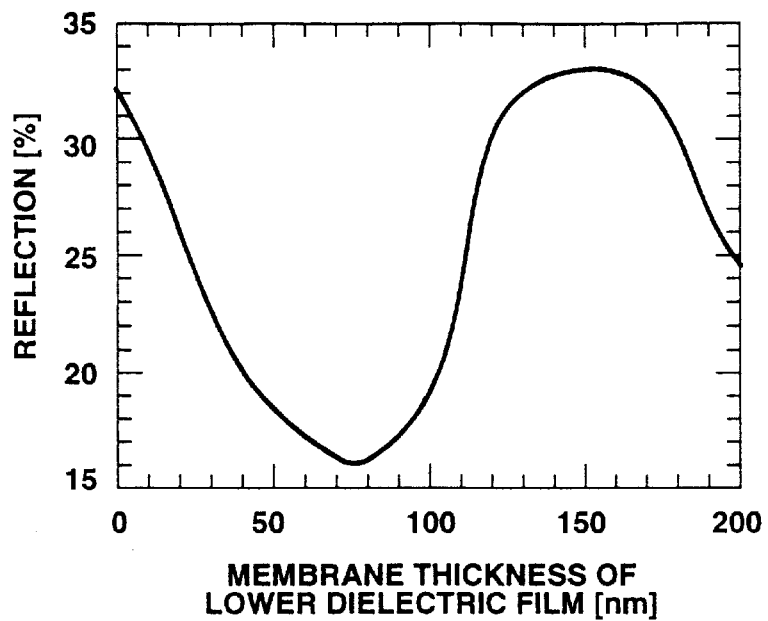
FIG. 5 illustrates a characteristic graph relating the membrane thickness of the four-layered magneto-optical disk indicated in FIG. 4, with the light reflection thereof.

Firstly, to determine the range of total membrane thickness of the first and second dielectric layers 3 and 4, a magneto-optical disk with a four-layered structure as shown in FIG. 4 was used. This four-layered magneto-optical disk 10 is produced after a lower dielectric layer 12 has been formed on a substrate 11, a recording layer 13 formed on the lower dipole layer 12, an upper dipole layer 14 formed on the recording layer 13, a reflective layer 15 formed on the upper dielectric layer 14, and a protective layer 16 formed on the reflective layer 15. Namely, with this four-layered magneto-optical disk 10, the membrane thickness of the lower dielectric layer 12 corresponds to the total membrane thickness of the first and second dielectric layers 3 and 4 of the magneto-optical disk 1. With the four-layered magneto-optical disk 10 of such constitution, the membrane thickness of the lower dielectric layer 12 was varied, and light reflection of the whole disk was determined. The result is shown in FIG. 5.

ISO standards with regard to 4× MO (magneto-optical disk having a four fold recording density) determine light reflection of the magneto-optical disk to be 12–25%. Accordingly, as is obvious from FIG. 5, the optimum value of membrane thickness of the lower dielectric layer of this four-layered magneto-optical disk 10 is 30–110 nm.

As the four-layered magneto-optical disk 10 must have a lower dielectric layer 12 with a thickness of 30–110 nm as described above, it is preferable for the magneto-optical disk 1 of this invention to have the first and second dielectric layers 3 and 4 which has a total membrane thickness of 30–110 nm.

Figure 6:
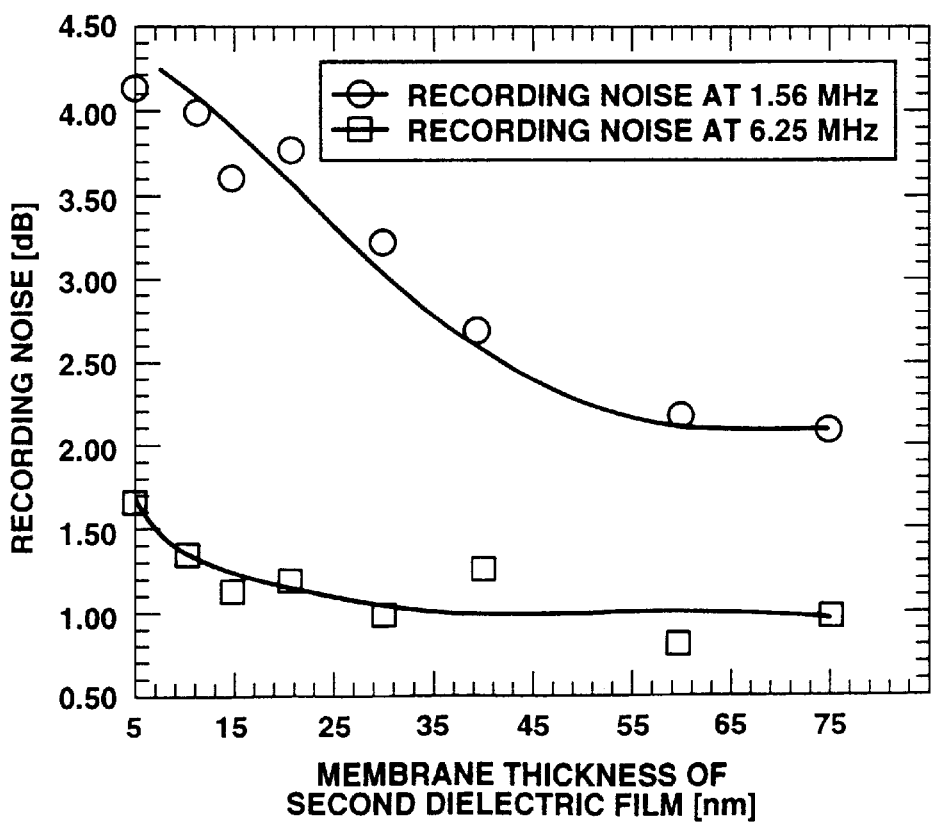
FIG. 6 illustrates a characteristic graph relating the membrane thickness of the second dielectric layer of a magneto-optical disk belonging to an embodiment of this invention, with noise in recording.

Further, with the second dielectric layer 4 composed of silicone nitride of this magneto-optical disk 1, its membrane thickness and noise with recording have a relationship as depicted in FIG. 6. To prepare the graph of FIG. 6, measurement was performed while the total membrane thickness of the first and second dielectric layers 3 and 4 was kept constant to be 75 nm. The measurement condition was as follows: the line speed was set at 6.6 m/sec, the line density at 0.4 $\mu$m/bit, and the shortest marks of (1.7) RLL mode or 2 T marks were recorded. Under this condition, output over the detection level at 6.25 MHz (2 T band) and at 1.56 MHz (8 T band) was measured and taken as a noise with recording. As is obvious from the figure, when the second dielectric layer 4 has a membrane thickness of 40 nm or more, the noise can be reduced. This is probably because, if the second dielectric layer 4 has a membrane thickness of 40 nm or less, the surface condition of the first dielectric layer 3 will affect the recording layer 5.

With this magneto-optical disk 1, it is possible to determine the upper limit (110 nm–40 nm=70 nm) of the first dielectric layer by calculating the difference between the upper limit (110 nm) of total membrane thickness of the first and second dielectric layers 3 and 4, and the lower limit (40 nm) of the second dielectric layer 4. Further, this magneto-optical disk 1, when the first dielectric layer 3 has a membrane thickness of 35 nm or more, will have a better recording and reproducing property. With this magneto-optical disk 1, it is preferable to set the range of membrane thickness of the first dielectric layer 3 at 35–70 nm.

With this magneto-optical disk 1, it is similarly possible to determine the upper limit (110 nm–35 nm=75 nm) of membrane thickness of the second dielectric layer 4 by calculating the difference between the upper limit (110 nm)

of membrane thickness of the first and second dielectric layers 3 and 4, and the lower limit (35 nm) of membrane thickness of the second dielectric layer 4. With this magneto-optical disk 1, it is preferable to set the range of membrane thickness of the second dielectric layer 4 at 40–75 nm.

Figure 7:
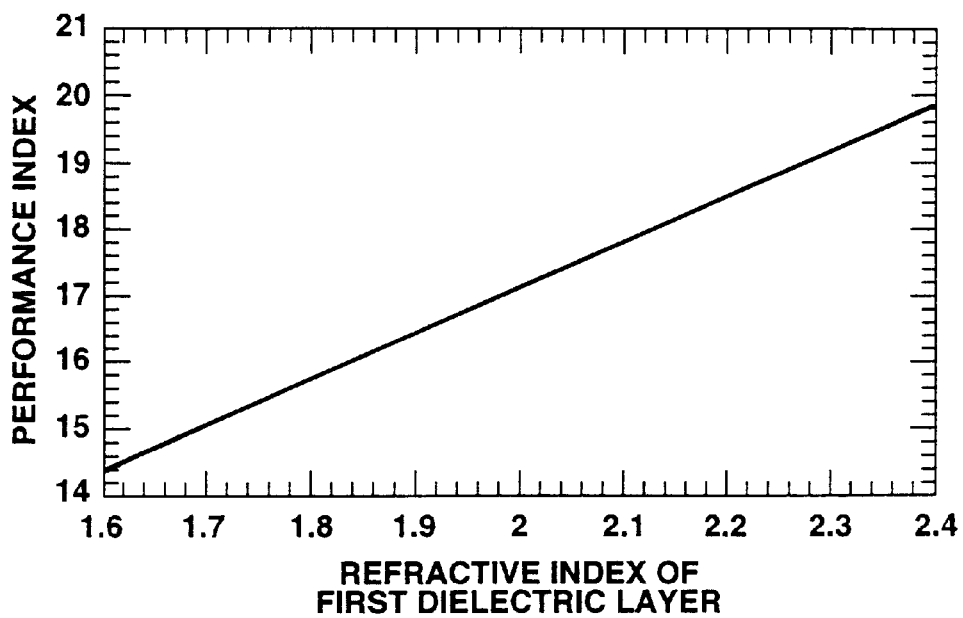
FIG. 7 illustrates a characteristic graph relating the refractive index of the first dielectric layer of a magneto-optical disk belonging to an embodiment of this invention, with the performance index thereof.

With this magneto-optical disk 1, when the refractive index of the first dielectric layer 3 is altered, the performance index of the magneto-optical disk 1 changes approximately in proportion to the refractive index as shown in FIG. 7. The performance index of a magneto-optical disk 1 can be expressed as the product of light reflection and Kerr's angle of rotation, and gives a value indicative of the recording and reproducing property of the magneto-optical disk 1. As is obvious from the figure, when the refractive index of the first dielectric layer 3 becomes larger, the performance index of the magneto-optical disk 1 also becomes larger.

With this magneto-optical disk 1, when the second dielectric layer 4 is composed of SiN, the refractive index of the second dielectric layer 4 becomes about 2.0. Accordingly, with this magneto-optical disk 1, when the total refractive index of the first and second dielectric layers 3 and 4 is made 2.0 or more, the performance index could be improved. As the second dielectric layer 4 composed of SiN has a refractive index of 2.0 or more, when the refractive index of the first dielectric layer 3 is made 2.0 or more, it will be possible to increase the total refractive index of the first and second dielectric layers 3 and 4. As seen from above, with the magneto-optical disk 1, it is possible to improve its performance index and repetitive recording and reproducing property by putting the refractive index of the first dielectric layer 3 over that of the second dielectric layer.

Figure 8:
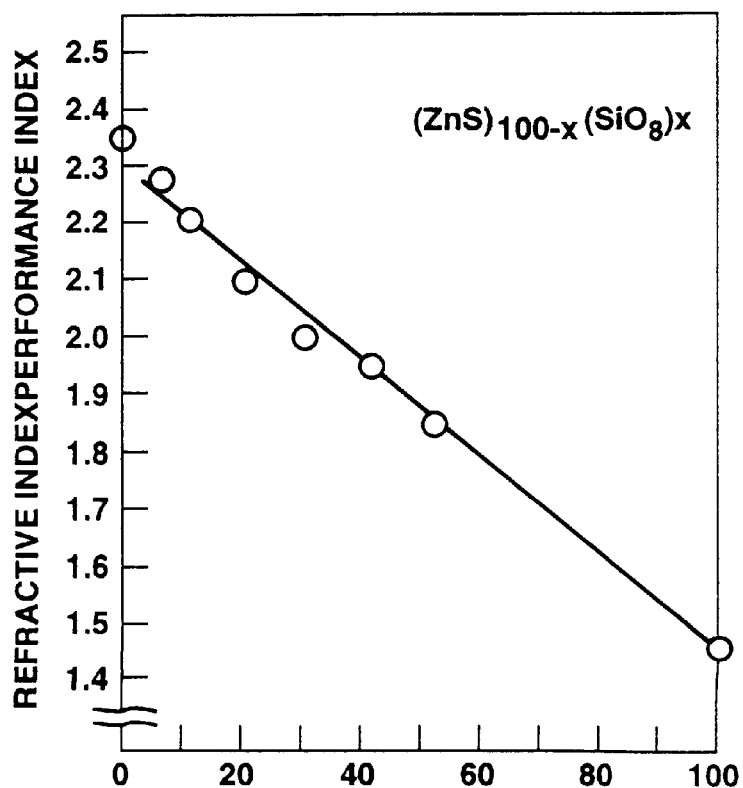
FIG. 8 illustrates a characteristic graph relating the added amount of $SiO_2$ into the first dielectric layer, with the refractive index of the first dielectric layer.

When the first dielectric layer 3 is composed of ZnS—$SiO_2$, the refractive index of the first dielectric layer 3 can be adjusted by changing the content of ZnS. To be more specific, the refractive index of the first dielectric layer 3 changes in accordance with the content of $SiO_2$, or with the content of ZnS as shown in FIG. 8. According to this figure, as described above, to raise the refractive index of the first dielectric layer 3 to 2.0 or more, it is necessary to set the content of $SiO_2$ at 30% or less. Thus, this magneto-optical disk 1 will have a good recording and reproducing property when the first dielectric layer 3 contains 70% or more ZnS.

With this magneto-optical disk 1, the recording layer 5 incorporates a TbFeCo amorphous compound, and is said to have a curie temperature of 200° C. or higher. Namely, for this magneto-optical disk 1 to record information signals, it is necessary to increase the temperature of the recording layer 5 over 200° C., thereby to eradicate magnetising thereof. Thus, with the magneto-optical disk 1, the recording layer 5 must have a temperature of 200° C. or higher before it is ready to record information signals. However, with this magneto-optical disk 1, the thermal conductivity of the first dielectric layer 3 is made smaller than that of the second dielectric layer 4. Thus, with this magneto-optical disk 1, heat in the recording layer 5 is not transmitted towards the substrate 2, but is dissipated outside from the side of protective layer 8. Hence, this magneto-optical disk 1 is free from deterioration of the substrate due to heating, and always enjoys a good recording and reproducing property.

With this magneto-optical disk 1 of above constitution, when it records information signals, a magnetic field is applied onto the recording layer 5 from the side of protective film 8, and at the same time a laser beam is irradiated onto the recording layer 5 from the side of substrate 2. With this magneto-optical disk 1, the part of recording layer 5 which is exposed to the irradiation of laser beam is increased in the temperature. Then, the recording layer 5 loses magnetising when it has been heated by the laser beam to a temperature over the curie temperature. Under this condition, when the recording layer 5 is cooled while being exposed to a magnetic field, the recording layer 5 is magnetized according to the magnetic field applied. As seen from above, with this magneto-optical disk 1, information signals are recorded as a magnetising direction of the recording layer 5.

To reproduce the information signal recorded in the magneto-optical disk 1, a light beam is irradiated onto the recording layer 5 from the side of substrate, and reflection of this light beam is detected. Then, the light beam has its polarized surface rotated depending on the magnetising direction of the recording layer 5 as a result of Kerr effect, and is reflected. Thus, it is possible to determine the magnetising direction of the recording layer 5 by detecting the rotation of the polarized surface, and thus to read the information signal recorded in the recording layer 5 on the basis of magnetic alteration.

EXAMPLES

Magneto-optical disks of Examples 1 to 4 to which this invention had been applied were actually produced. In addition, magneto-optical disks of Comparative Exmples 1 to 3 were also produced to be compared with the examples.

Example 1

Firstly, a clear, disc-like substrate made of a polycarbonate resin was prepared. Then, on this substrate was formed a first dielectric layer composed of ZnS—20 mol % $SiO_2$ to give a thickness of 15 nm by RF sputtering, upon which was then formed a second dielectric layer of $Si_3N_4$ to give a thickness of 60 nm by RF sputtering. Next, a layer incorporating a TbFeCo rare earth/transition metal amorphous compound or a compound giving a curie temperature of 260° C. was formed to give a thickness of 20 nm by DC magnetron sputtering. While the disk in preparation was held in a vacuum, an upper dielectric layer composed of $Si_3N_4$ was formed to give a thickness of 25 nm. On this upper dielectric layer was layered a reflective layer composed of AlTi to give a thickness of 45 nm, thereby to produce a magneto-optical disk of Example 1.

Examples 2 to 4

These examples are practically the same in structure as Example 1 except that the membrane thicknesses of first and second dielectric layers were changed for the production of magneto-optical disks.

In Example 2, the first and second dielectric layers were made to have a thickness of 35 nm and 40 nm respectively, to produce magneto-optical discs in the same manner as in Example 1.

In Example 3, the first and second dielectric layers were made to have a thickness of 55 nm and 20 nm respectively, to produce magneto-optical discs in the same manner as in Example 1.

In Example 4, the first and second dielectric layers were made to have thicknesses of 60 nm and 50 nm respectively, to produce magneto-optical discs in the same manner as in Example 1.

Comparative Exmple 1

The magneto-optical disk as represented by Comparative Exmple 1 is provided with a lower dielectric layer formed on a substrate, a recording layer formed on this lower dielectric layer, an upper dielectric layer formed on this recording layer and a reflective layer formed on this upper dielectric layer.

This comparative Exmple 1 incorporates a polycarbonate resin as the substrate, on which the lower dielectric layer composed of $Si_3N_4$ was formed by RF sputtering to give a thickness of 75 nm. Next, a TbFeCo rare earth/transition metal amorphous compound with a curie temperature of 260° C. to produce a recording layer was coated thereupon by DC magnetron sputtering to give a thickness of 20 nm. While the disk in preparation was held in a vacuum, an upper dielectric layer composed of $Si_3N_4$ was formed to give a thickness of 35 nm. On this upper dielectric layer was layered a reflective layer composed of AlTi to give a thickness of 50 nm, thereby to produce a magneto-optical disk.

Comparative Exmples 2 and 3

Comparative Exmples 2 and 3 are practically the same in structure with Comparative Exmple 1 except that the lower dielectric layer was so modified as to have an altered thickness and the recording layer to have an altered curie temperature, for the production of magneto-optical disks.

In Comparative Exmple 2, the lower dielectric layer was made to have a thickness of 110 nm and the recording layer was so changed in its composition that it might have a curie temperature of 180° C., and then the disk was processed in the same manner as in Comparative Exmple 1 to produce a magneto-optical disk.

In Comparative Exmple 3, the lower dielectric layer was made to have a thickness of 110 nm and the recording layer was so changed in its composition that it might have a curie temperature of 260° C., and then the disk was processed in the same manner as in Comparative Exmple 1 to produce a magneto-optical disk.

EVALUATION OF PERFORMANCE

Examples 1 to 4 and Comparative Exmples 1 to 3 prepared as described above were submitted to the tests for repetitive record reproduction property and recording property as shown below.

<Repetitive record reproduction property>

Figure 9:
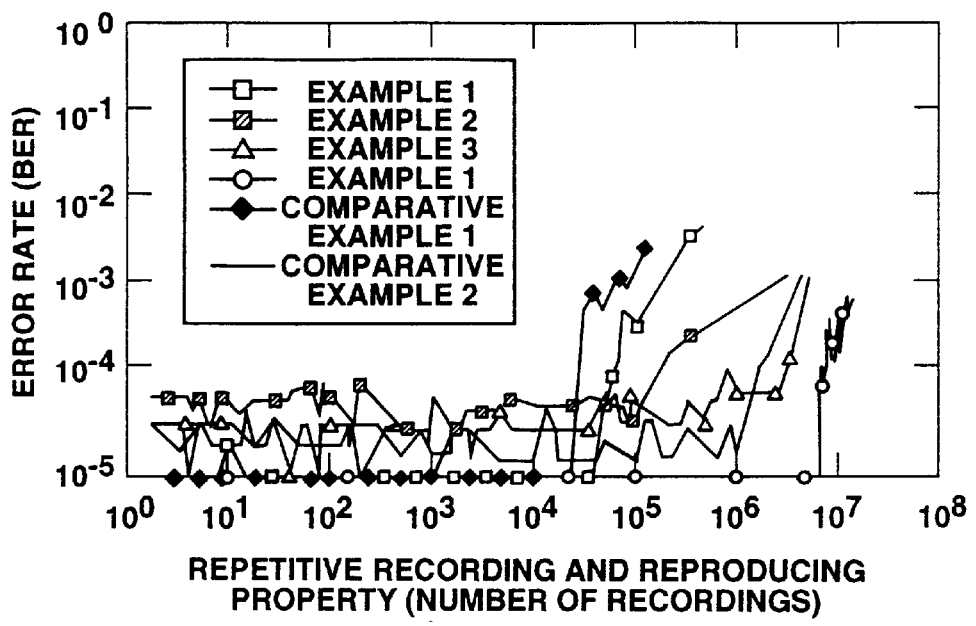
FIG. 9 illustrates a characteristic graph indicating repetitive recording and reproducing performance in which the abscissa represents the number of repetitive recordings, and the ordinate the error rate.

For the evaluation of repetitive record reproduction property, a DC power of 10 mW was used. The result is shown in FIG. 9. With the magneto-optical disk, the tolerable level of correctable error rate may be BER (byte error rate) of $10^{-3}$, and that of repetitive recording may be $10^6$ recordings.

As is obvious from FIG. 9, for Example 1, the number of repetitive recordings at which BER exceeds $10^{-3}$ is larger than the corresponding one of Comparative Exmple 1. As the total membrane thickness of the first and second dielectric layers of Example 1 is the same with that of the lower dielectric layer of Comparative Exmple 1, the improved repetitive recording property of Example 1 may be ascribed to the fact that Example 1 is provided with the first dielectric layer, and the second dielectric layer which has a larger thermal conductivity than that of the first dielectric layer. Namely, with the magneto-optical disk of Example 1, during repetitive recording, the substrate was not so much heated as to undergo deterioration, and this underlies the improved repetitive recording and reproducing property of that disk.

Further, as is obvious from FIG. 9, the repetitive recording and reproducing performance increases from Example 1, through Examples 2 and 3 to Example 4 in this order. In Examples 2, 3 and 4, the number of repetitive recordings at which BER exceeds $10^{-3}$ is larger than $10^6$. This suggests that the existence of a first dielectric layer with 35 nm in thickness is adequate to give a sufficient repetitive recording and reproducing property. This is probably because of a less thermal conductivity of that first dielectric layer and its larger thickness which will impede the transmission of heat from the recording film to the substrate, thereby preventing the elevation of temperature of the latter.

<Recording Property>

For the evaluation of recording property, the measurement was performed under the following condition: the line speed was set at 6.6 m/sec, the line density at 0.4 µm/bit, and the shortest marks of (1.7) RLL mode or 2 T marks were recorded. The result is shown in FIG. 10.

Figure 10:
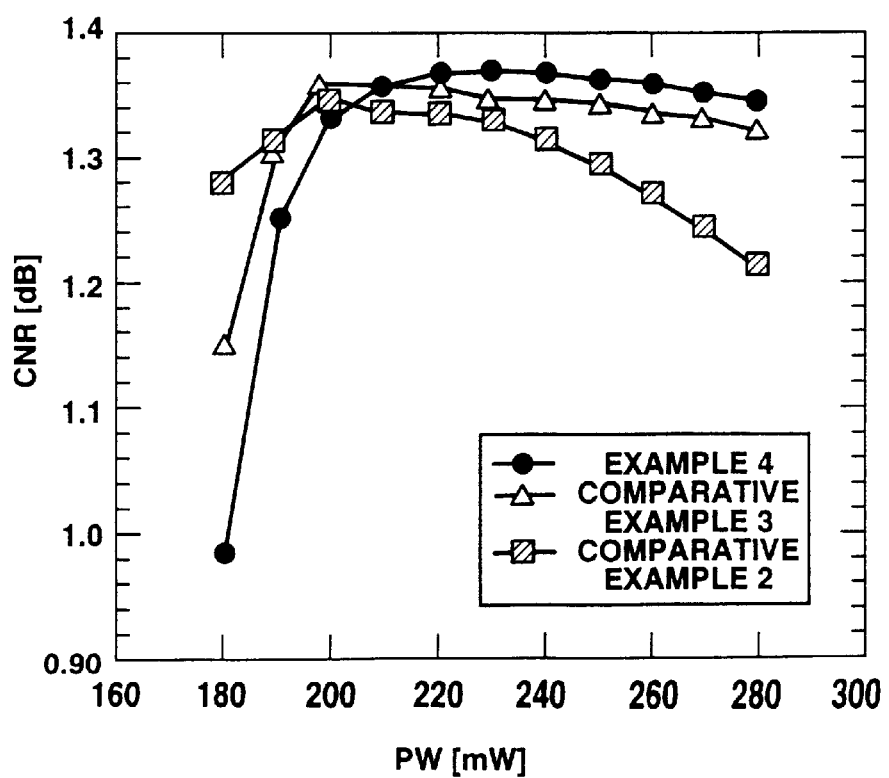
FIG. 10 illustrates characteristic graphs indicating the recording properties of Example 4, and Comparative Exmples 2 and 3.

As is obvious from FIG. 10, Examples 4 and Comparative Exmple 3 whose curie temperature is 260° C. have higher CNRs than Example 2 whose curie temperature is 180° C. Namely, although Comparative Exmple 2 has a good repetitive recording and reproducing property as shown in FIG. 9, it does not give a good result in recording property. By contrast, Example 4 has a good recording and reproducing property as seen from FIG. 9, and also gives a good result in recording property. From this it is concluded that a magneto-optical disk, when it comprises a first dielectric layer with a comparatively small thermal conductivity, and a second dielectric layer with a comparatively large thermal conductivity placed one over the other into a layered structure, and also comprises a recording layer with a curie temperature of 200° C. or higher, gives a good repetitive recording and reproducing property and a good recording property.

As detailed above, the magneto-optical recording medium according to this invention has first and second dielectric layers inserted between a substrate and a recording layer in this order, and ensures the substrate to keep a good condition by making the thermal conductivity of the first dielectric layer smaller than that of the second dielectric layer, thereby preventing the substrate from being exposed to high temperatures. Further, this magneto-optical recording medium, by incorporating a recording layer with a curie temperature of 200° C. or higher, enlarges the signal quantity of information signals, thereby ensuring a good recording property.

What is claimed is:

1. A magneto-optical recording medium comprising:

a substrate;

a first dielectric layer containing ZnS formed on the substrate;

a second dielectric layer formed on the first dielectric layer and containing at least silicone nitride, the first and second dielectric layers having thermal conductivities such that the thermal conductivity of the first dielectric layer is $\frac{1}{5}$ to $\frac{1}{3}$ of that of the second dielectric layer; and a recording layer formed on the second dielectric layer and having a Curie temperature of 200° C. or higher.

2. A magneto-optical recording medium as described in claim 1 which is characterized in that the content of ZnS in the first dielectric layer is not less than 70 mol %.

3. A magneto-optical recording medium as described in claim 1 which is characterized in that the first dielectric layer has a thickness of 35–70 nm.

4. A magneto-optical recording medium as described in claim 1 which is characterized in that the second dielectric layer has a thickness of 40–75 nm.

5. A magneto-optical recording medium as described in claim 1 which is characterized in that the first dielectric layer is allowed to have a larger refractive index than the second dielectric layer.

* * * * *